US012601584B2

(12) United States Patent
Mori et al.

(10) Patent No.: US 12,601,584 B2
(45) Date of Patent: Apr. 14, 2026

(54) MEASUREMENT METHOD OF SURFACE SHAPE AND SURFACE SHAPE MEASUREMENT DEVICE

(71) Applicant: MITUTOYO CORPORATION, Kanagawa (JP)

(72) Inventors: Yumiko Mori, Kanagawa (JP); Yoshiaki Kato, Saitama (JP)

(73) Assignee: MITUTOYO CORPORATION, Kanagawa (JP)

( * ) Notice: Subject to any disclaimer, the term of this patent is extended or adjusted under 35 U.S.C. 154(b) by 221 days.

(21) Appl. No.: 18/120,696

(22) Filed: Mar. 13, 2023

(65) Prior Publication Data

US 2023/0324168 A1 Oct. 12, 2023

(30) Foreign Application Priority Data

Mar. 22, 2022 (JP) ................................. 2022-046102

(51) Int. Cl.
*G01B 11/06* (2006.01)
*G01B 9/0209* (2022.01)
(Continued)

(52) U.S. Cl.
CPC ........ *G01B 11/0608* (2013.01); *G01B 9/0209* (2013.01); *G01B 11/2441* (2013.01);
(Continued)

(58) Field of Classification Search
CPC ............ G06T 2207/20048; G06T 7/73; G01B 9/02084; G01B 11/30; G01B 11/0608; G01B 9/0209; G01B 11/2441
See application file for complete search history.

(56) References Cited

U.S. PATENT DOCUMENTS 4,818,110 A * 4/1989 Davidson ........... G01B 9/02083
356/512
7,522,288 B2 * 4/2009 De Groot ............. G01B 9/0209
356/497
(Continued)

FOREIGN PATENT DOCUMENTS

JP 2011-191118 A 9/2011

OTHER PUBLICATIONS

Wikipedia article "Euclidean Division" as archived Feb. 2021 (Year: 2021).*

(Continued)

*Primary Examiner* — Tarifur R Chowdhury
*Assistant Examiner* — Paul Schnase
(74) *Attorney, Agent, or Firm* — Greenblum & Bernstein, P.L.C.

(57) ABSTRACT

A measurement method of a surface shape and a surface shape measurement device uses an interferometer optical head that acquires an interference fringe image generated by a light path difference between the reference light and the measurement light, acquires N interference fringe images by scanning from a start point to an end point in the Z-axis direction, and measures the surface shape of the measurement target surface based on the interference fringe images. For a common position in the N interference fringe images, regarding an interference signal including values of N points that indicates a change in the interference light intensity along the Z-axis direction, a phase of an interference fringe produced by the light of a predetermined analysis wavelength is determined, and the relative position in the Z-axis direction of the measurement target surface within the range of the analysis wavelength is determined based on the phase.

9 Claims, 8 Drawing Sheets

(51) Int. Cl.

| | |
|---|---|
| *G01B 11/24* | (2006.01) |
| *G06T 7/55* | (2017.01) |
| *G06T 7/60* | (2017.01) |
| *G06T 7/73* | (2017.01) |

(52) U.S. Cl.

CPC ................. *G06T 7/55* (2017.01); *G06T 7/60* (2013.01); *G06T 7/73* (2017.01); *G06T 2207/20048* (2013.01)

(56) References Cited

U.S. PATENT DOCUMENTS

2011/0222069  A1    9/2011  Nagahama et al.
2018/0172425  A1*   6/2018  Yang ................. G01N 21/4795

OTHER PUBLICATIONS

Rouse, M. "Real-Time Data Processing". Last updated May 23, 2016. (Year: 2016).*

Wikipedia article "Segmented regression" as archived Jan. 2022 (Year: 2022).*

Wikipedia 1 article "Euclidean Division" as archived Feb. 2021 (Year: 2021).*

Wikipedia 2 article "Segmented regression" as archived Jan. 2022 (Year: 2022).*

Changhuei Yang, Adam Wax, Ramachandra R. Dasari, and Michael S. Feld, "$2\pi$ ambiguity-free optical distance measurement with subnanometer precision with a novel phase-crossing low-coherence interferometer," Opt. Lett. 27, 77-79 (Year: 2002).*

Waner, Stefan and Costenoble, Steven; "Calculus Applied to Probability and Statistics"; Chapter 3 "Mean, Median, Variance and Standard Deviation"; Last updated Sep. 1996. (Year: 1996).*

U.S. Appl. No. 18/120,581 to Yumiko Mori et al., which was filed on Mar. 13, 2023.

* cited by examiner

201

MEASUREMENT METHOD OF SURFACE SHAPE AND SURFACE SHAPE MEASUREMENT DEVICE

CROSS-REFERENCE TO RELATED APPLICATION

This non-provisional application claims priority under 35 U.S.C. § 119 (a) from Japanese Patent Application No. 2022-046102, filed on Mar. 22, 2022, the entire contents of which are incorporated herein by reference.

BACKGROUND

Technical Field

The present invention relates to a measurement method of a surface shape and a surface shape measurement device, using an interferometer optical head.

Background Art

Surface shape measurement devices that precisely measure surface shapes of measurement targets, and the like, using luminance information of interference fringes caused by light interference are conventionally known.

For example, in a surface shape measurement device that uses a light source which applies light with low coherency, such as white light, the luminance of the interference fringes combined by way of peaks of the interference fringes of the respective wavelengths being overlapped with each other becomes high at a focus point where the light path lengths of the reference light path and the measurement light path coincide. Therefore, the surface shape measurement device can measure a surface shape of a measurement target by: capturing an interference fringe image, which shows a two-dimensional distribution of the interference light intensity, by means of an imaging element, such as a CCD camera, while changing the light path lengths of the reference light path or the measurement light path; and detecting a focus point where the intensity of the interference light peaks at each measurement position in the capturing field of view so as to measure the height of the measuring surface (i.e., the surface of the measurement target) at each measurement position (see, for example, Patent Document 1).

PRIOR ART DOCUMENTS

Patent Document

Patent Document 1: JP2011-191118A

SUMMARY OF THE INVENTION

Problem to be Solved by the Invention

In the above-described surface shape measurement device, the change in luminance of interference light occurs with a period of about the wavelength of light that generates interference. Therefore, capturing of the interference fringe image needs to be repeated while changing the light path length of the reference light path or the measurement light path at intervals sufficiently smaller than the wavelength. The surface shape measurement device then analyzes hundreds to thousands of accumulated interference fringe images to identify the height of the measuring surface at each pixel position. This analysis includes rough peak detection processing in which the height at which the intensity of the interference light is at a maximum is roughly detected, and fine peak detection processing in which the detailed height is determined.

In the rough peak detection processing, for a position of each pixel constituting the interference fringe image, a peak search is performed after applying processing for determining the signal waveform that indicates the change in luminance value relative to the position in the height direction, and after applying signal processing, such as the square, integration, and smoothing differential, to the signal waveform, so as to determine the height at which the intensity of the interference light is at a maximum. In the fine peak detection processing, the detailed height of the measuring surface is determined by focusing on the phase of the signal waveform at the position of each pixel constituting the interference fringe image. Specifically, in the fine peak detection processing, after data around the interference part is extracted by the rough peak detection processing, phase analysis is performed on the extracted data using an FFT, and the peak of the interference signals is analyzed.

In this way, with the conventional surface shape measurement devices, a large amount of time is required for a single surface shape measurement because the analysis processing is further performed on all the obtained images after a large number of interference fringe images are captured. In addition, the transversal analysis processing performed on a large number of accumulated images requires a large amount of work memory and high computational power. Moreover, the conventional fine peak detection processing cannot be executed in parallel with the rough peak detection processing.

Accordingly, an object of the present invention is to provide a measurement method of a surface shape and a surface shape measurement device that can solve the above-described problem, suppress the work memory and computational power necessary for analysis processing, and thereby reduce the measurement time.

Means for Solving the Problem

In order to solve the above problem, the measurement method of a surface shape pertaining to the present invention: uses an interferometer optical head that divides, by a beam splitter, incoherent light applied from a light source into reference light to a reference mirror and measurement light to a measurement target surface, and acquires an interference fringe image generated by a light path difference between light reflected from the reference mirror and light reflected from the measurement target surface: acquires N (where N≥2) interference fringe images while scanning the interferometer optical head, with respect to the measurement target surface, from a start point to an end point in the Z-direction along a light axis of the interferometer optical head; and measures a surface shape of the measurement target surface based on the N interference fringe images. In this measurement method, for a common position in the N interference fringe images, regarding an interference signal consisting of values of N points that indicates a change in the interference light intensity along the Z-axis direction, a phase $\varphi$ of an interference fringe produced by the light of a predetermined analysis wavelength $\Lambda$ is determined, and the relative position $Z_{FA}$ in the Z-axis direction of the measurement target surface within the range of the analysis wavelength is identified based on the phase $\varphi$.

In the present invention, the relative position $Z_{FA}$ in the Z-axis direction of the measurement target surface may be calculated by Equation (1):

$$Z_{FA=}\phi \times \frac{\Lambda}{2\pi} \tag{1}$$

In the present invention, a Fourier transform $F(\Lambda^{-1})$ at the analysis wavelength $\Lambda$ of the interference signal $f(z)$ may be determined based on Equation (2):

$$F(\Lambda^{-1}) = \sum_{n=1}^{N} f(n \cdot z_p)e^{-i\frac{2\pi}{\Lambda}n \cdot z_p} \tag{2}$$

where a scan pitch in the Z-axis direction is $z_p$ and an order of a data point counted from the start point is n-th, and the phase $\phi$ of the interference fringe produced by the light at the analysis wavelength $\Lambda$ may be determined based on an argument of the $F(\Lambda^{-1})$, which is obtained as a complex number.

In the present invention, the $F(\Lambda^{-1})$ may be determined by a discrete Fourier transform by selecting $\xi$ and $\Lambda$ so that $\Lambda = N \cdot z_p/\xi$ with $\xi$ as an integer.

In the present invention, after acquiring the first interference fringe image, analysis processing is performed on the interference fringe images up to the M−1-th image while sequentially acquiring the M-th (where $2 \leq M \leq N$) interference fringe image.

The analysis processing includes Fourier transform processing in which: the value of Equation (3):

$$f(K \cdot z_p)e^{-i\frac{2\pi}{\Lambda}K \cdot z_p} \tag{3}$$

is calculated, at least, for each position in the lastly acquired K-th interference fringe image, this value is added to Equation (4):

$$\sum_{n=1}^{K-1} f(n \cdot z_p)e^{-i\frac{2\pi}{\Lambda}n \cdot z_p} \tag{4}$$

which is a discrete sum of the Fourier transform $F(\Lambda^{-1})$, which has been determined for the points up to the point K−1-th, and thereby, Equation (5):

$$\sum_{n=1}^{K} f(n \cdot z_p)e^{-i\frac{2\pi}{\Lambda}n \cdot z_p} \tag{5}$$

is calculated, which is a discrete sum of the Fourier transform $F(\Lambda^{-1})$ at the analysis wavelength $\Lambda$ for the points up to the K-th point.

Then, the discrete sum obtained by the Fourier transform processing in the analysis processing after acquiring the N-th interference fringe image may be the Fourier transform $F(\Lambda^{-1})$ at the analysis wavelength $\Lambda$ of the interference signal $f(z)$.

In the present invention, when the absolute position $Z_S$ in the Z-axis direction of the measurement target surface is expressed as $Z_S = \Lambda \times m + Z_{FA}$ with m as an integer, the integer m may be identified based on a position ZR in the Z-axis direction of the measurement target surface obtained by a method different from the calculation of the relative position $Z_{FA}$, and the absolute position $Z_S$ may be calculated using $Z_S = \Lambda \times m + Z_{FA}$.

In the present invention, m may be an integer closest to $(Z_R - Z_{FA})/\Lambda$. In this case, the wavelength $\Lambda$ may be selected so as to be $k \times 2^n$ (where k is a value whose integer multiples of 2 or more are the scan pitch $z_p$).

In the present invention, from an integral curve consisting of values of N points, which is obtained by integrating square values or absolute values of the interference signal: a start-point-side noise part straight line that approximates a start-point-side noise part, which corresponds to a range without the occurrence of interference closer to the start point than to the measurement target surface; an end-point-side noise part straight line that approximates an end-point-side noise part, which corresponds to a range without the occurrence of interference closer to the end point than to the measurement target surface; and an interference part straight line that approximates an interference part, which corresponds to a range with the occurrence of interference in the vicinity of the measurement target surface, may be determined, and the position $Z_R$ in the Z-axis direction of the measurement target surface may be determined based on the start-point-side noise part straight line, the end-point-side noise part straight line, and the interference part straight line.

In the present invention, the analysis wavelength $\Lambda$ may be selected from the vicinity of a wavelength at which signal intensity is at a maximum when light applied from the light source is received at a light-receiving element for imaging the interference fringe image. The analysis wavelength $\Lambda$ may be between 290 nm and 350 nm, inclusive. The analysis wavelength $\Lambda$ may be 320 nm, in particular.

In addition, the surface shape measurement device pertaining to the present invention measures the surface shape of a measurement target surface of a measurement target. Such surface shape measurement device comprises: an interferometer optical head that divides, by a beam splitter, light applied from a light source that applies incoherent light into reference light to a reference mirror and measurement light to the measurement target surface, and acquires, by an imaging element, an interference fringe image generated by a light path difference between light reflected from the reference mirror and light reflected from the measurement target surface, and an analysis unit that determines the surface shape of the measurement target surface based on the interference fringe image acquired by the interferometer optical head. The interferometer optical head acquires N (where $N \geq 2$) interference fringe images while scanning, with respect to the measurement target surface, from a start point to an end point in the Z-axis direction along a light axis of the interferometer optical head. For a common position in the N interference fringe images acquired by the interferometer optical head, the analysis unit determines, regarding an interference signal consisting of values of N points that indicate a change in interference light intensity along the Z-axis direction, a phase of an interference fringe produced by light at an analysis wavelength $\Lambda$, and identifies a relative position $Z_{FA}$ in the Z-axis direction of the measurement target surface within the range of the analysis wavelength based on the phase.

EMBODIMENTS OF THE INVENTION (Configuration of Surface Shape Measurement Device)

A surface shape measurement device 1, which is a first embodiment of the surface shape measurement device 1 according to the present invention, will be described with reference to the drawings. The surface shape measurement device 1 is obtained by combining an interference optical system and an image measurement device.

Figure 1:
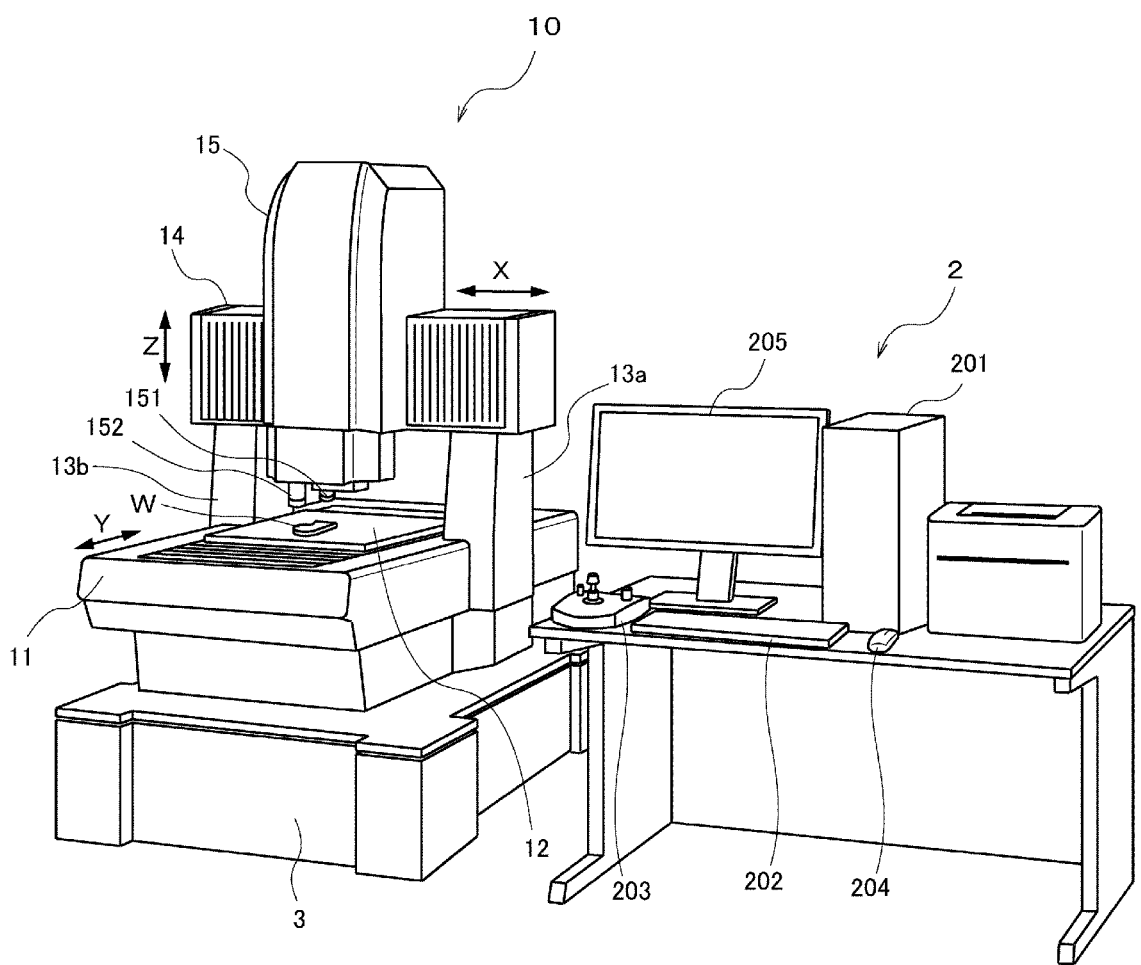
FIG. 1 is a perspective view showing the entire configuration of a surface shape measurement device 1.

FIG. 1 is a perspective view showing the entire configuration of the surface shape measurement device 1 according to the first embodiment. The surface shape measurement device 1 measures the surface shape of a measurement target surface of a measurement target (workpiece) W. The surface shape measurement device 1 includes a contactless image measurement machine 10 and a computer system 2 that drives and controls the image measurement machine 10 and performs the necessary data processing. In addition to the above, the surface shape measurement device 1 may include a printer, or the like, to print out the measurement results, or the like, as appropriate.

The image measurement machine 10 includes a cradle 11, a specimen table (stage) 12, support arms 13a and 13b, an X-axis guide 14, and an imaging unit 15. As shown in FIG. 1, the surface shape measurement device 1 is placed on a vibration removal table 3 installed on the floor. The vibration removal table 3 prevents the vibration of the floor from propagating to the surface shape measurement device 1 on the table. The vibration removal table 3 may be either active or passive. The cradle 11 is placed on the top panel of the vibration removal table 3, and on top of which, the stage 12 where the workpiece W is placed is placed so that the top surface as the base plane is aligned with the horizontal plane. In the following, the description is provided with the X and Y axes extending in the direction parallel to the base plane of the stage 12 and the Z axis extending in the direction perpendicular to the base plane. The stage 12 is driven in the Y-axis direction by a Y-axis drive mechanism not shown, and the workpiece W is movable in the Y-axis direction with respect to the imaging unit. The supporting arms 13a and 13b extending upwardly are fixed at the centers of the two sides of the cradle 11, and the X-axis guide 14 is fixed so that the upper ends of the supporting arms 13a and 13b are coupled. This X-axis guide 14 supports the imaging unit 15. The imaging unit 15 is driven along the X-axis guide 14 by an X-axis drive mechanism not shown.

The imaging unit 15 includes an image optical head 151 for imaging a two-dimensional image of the workpiece W and an interferometer optical head 152 for measuring the surface shape of the workpiece W by light interference measurement. Using either head, the workpiece W is measured at a measurement position set by the computer system 2. The measurement field of view of the image optical head 151 is usually set wider than the measurement field of view of the interferometer optical head 152, and both heads can be switched and used by control of the computer system 2. The image optical head 151 and the interferometer optical head 152 are supported by a common support plate so as to maintain a constant positional relationship, and are pre-calibrated so that the coordinate axes of the measurement do not change before and after the switching.

The image optical head 151 includes a CCD camera, an illumination device, a focusing mechanism, and other elements, and captures a two-dimensional image of the workpiece W. The data of the captured two-dimensional image is imported into the computer system 2.

Figure 2:
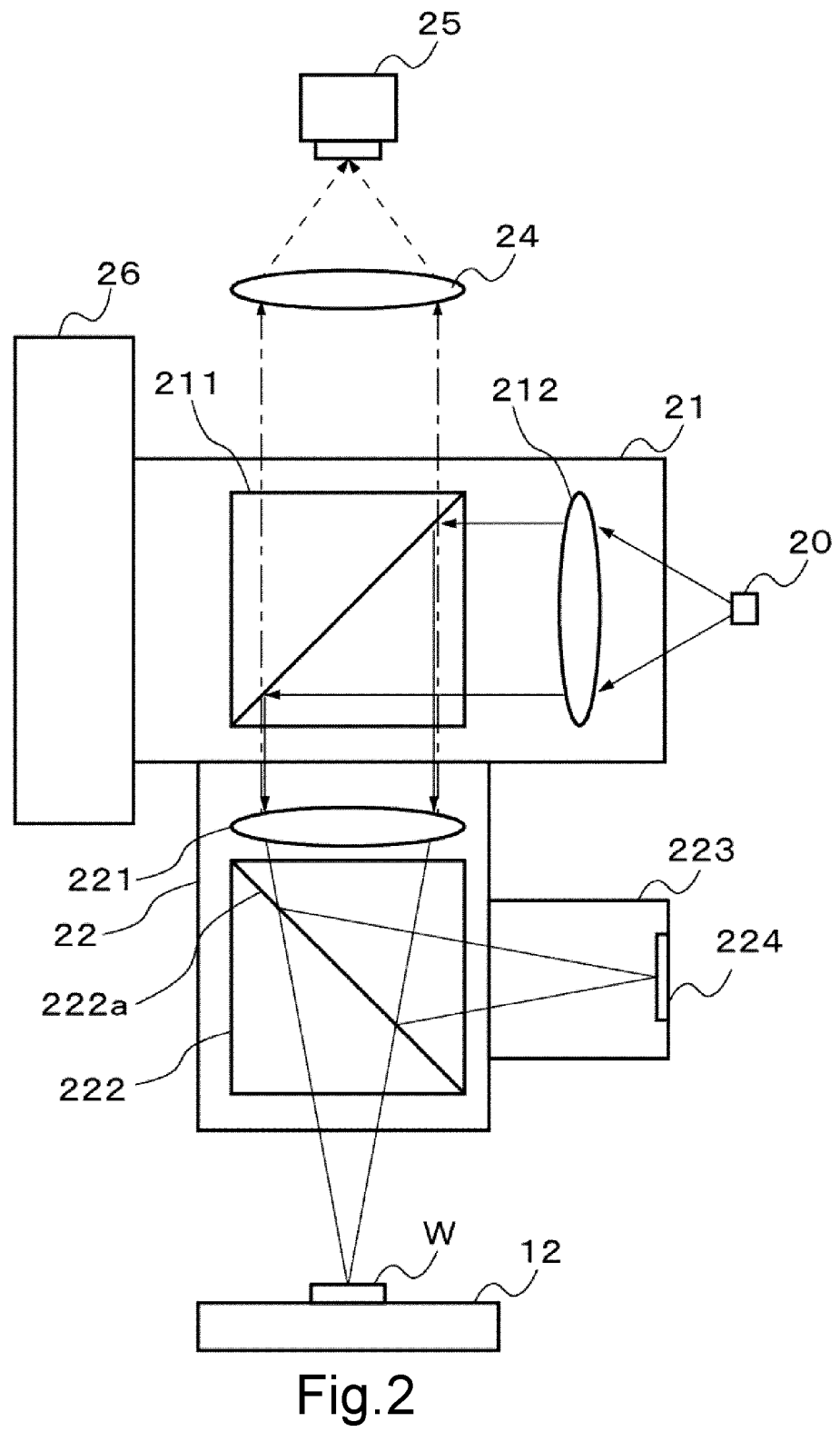
FIG. 2 is a schematic diagram showing a configuration of an interferometer optical head 152 along with the light paths.

FIG. 2 is a schematic diagram showing the configuration of the interferometer optical head 152 along with the light paths. As will be described below, the interferometer optical head 152 acquires, by an imaging element, an interference fringe image generated by the light path difference between light reflected from the measurement light path and light reflected from the reference light path. The interferometer optical head 152 constitutes a Michelson-type interferometer as shown in FIG. 2, and includes a light-emitting section 20, an illumination light guiding section 21, an objective lens section 22, an image-forming lens 24, an imaging section 25, and a driving mechanism section 26.

The light-emitting section 20 is a light source that applies light with low coherency (i.e., incoherent light). Here, the light with low coherency may be, for example, light with a coherence length of approximately 100 μm or less. The light-emitting section 20 outputs wide-band light with low coherency, having a large number of wavelength components over a wide band (e.g., wavelengths of 500 to 800 nm). For example, a lamp light source (such as halogen), a light-emitting diode (LED), a super luminescent diode (SLD), and other light sources, are used for the light-emitting section 20. The light output from the light-emitting section 20 is preferably, for example, white light, but the light is not limited thereto, as long as the light is light with low coherency.

The illumination light guiding section 21 includes a beam splitter 211 and a collimator lens 212. The light emitted from the light-emitting section 20 is applied in a parallel manner to the beam splitter 211 via the collimator lens 212 from the direction perpendicular to the light axis of the objective lens section 22, and then, from the beam splitter 211, the light along the light axis is emitted and a parallel beam is applied from above to the objective lens section 22.

The objective lens section 22 is configured to include an objective lens 221, a beam splitter 222, a reference mirror section 223, and other elements. The reference mirror section 223 also includes a reference mirror 224 at a predetermined position. In the objective lens section 22, when the parallel beam enters the objective lens 221 from above, the entered light becomes convergent light at the objective lens 221 and enters a reflective surface 222a inside the beam splitter 222.

The entered light is branched off, at the beam splitter 222, into reflected light (reference light) that travels along the reference light path in the reference mirror section 223 and transmitted light (measurement light) that travels along the measurement light path in which the workpiece W is placed. The reflected light is reflected by the reference mirror 224, and then further reflected by the reflective surface 222a of the beam splitter 222. On the other hand, the transmitted light travels while converging, is reflected by the workpiece W, and transmits through the reflective surface 222a of the beam splitter 222. The reflected light from the reference mirror 224 and the reflected light from workpiece W are combined into a combined wave by the reflective surface 222a of the beam splitter 222.

The combined wave combined at the position of the reflective surface 222a of the beam splitter 222 becomes a parallel beam at the objective lens 221, travels upwards, passes through the illumination light guiding section 21, and enters the image forming lens 24 (the dashed-dotted line in FIG. 2). The image forming lens 24 converges the combined wave and forms an interference fringe image on the imaging section 25.

The imaging section 25 is, for example, a CCD camera consisting of two-dimensional imaging elements for constituting the imaging means, and it images an interference fringe image of the combined wave (the reflected light from the workpiece W and the reflected light from the reference mirror 224) output from the objective lens section 22.

Figure 3:
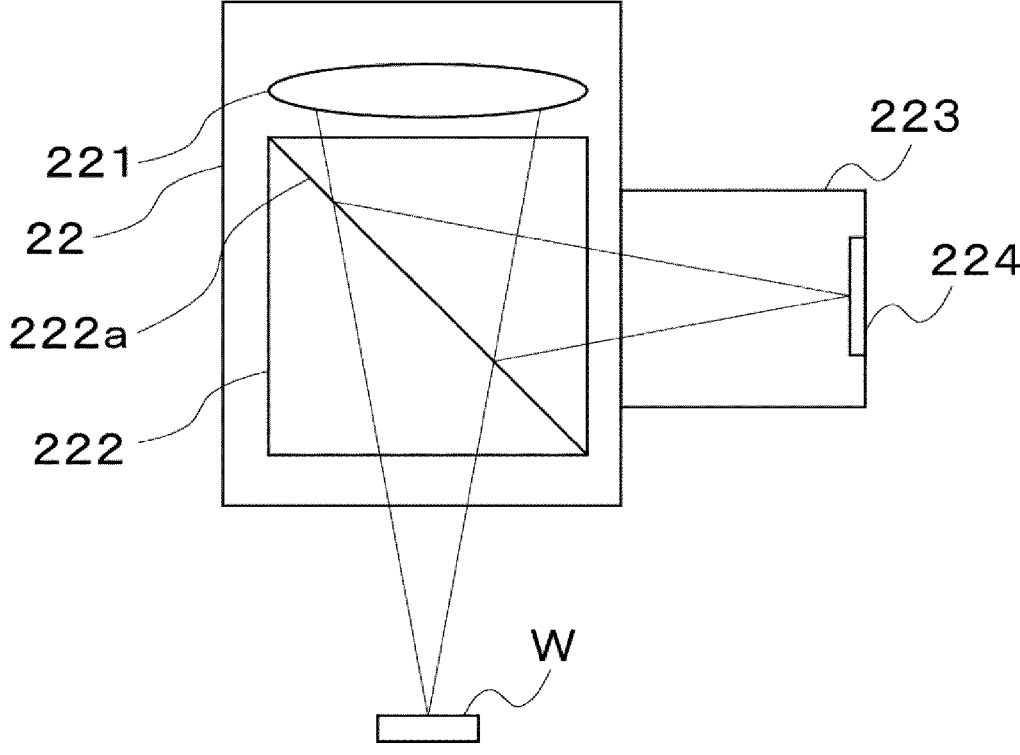
FIG. 3 is a main section enlarged view showing a structure of an objective lens section 22, and a measurement light path and a reference light path.

FIG. 3 is a main section enlarged view of the objective lens section 22. The driving mechanism section 26 corresponds to a light path length variable means of the present invention, and moves the interferometer optical head 152 in the light axis direction by a movement command from the computer system 2. FIG. 3 shows that a state in which the reference light path (dashed line) and the measurement light path (solid line) are equal in light path length. When performing the measurement, a large number of interference fringe images are acquired with different measurement light path lengths by capturing the interference fringe images while moving the interferometer optical head 152 in the light axis direction (i.e., in the Z-axis direction). Interference occurs when the difference between the length of the measurement light path and the length of the reference light path is approximately coherent length or less from the light source, and the interference intensity becomes the highest (i.e., the contrast of the interference fringes reaches the maximum) when the length of the measurement light path and the length of the reference light path coincide. It should be noted that, although the case of moving the interferometer optical head 152 is explained as an example above, it is also possible to have a configuration in which the length of the measurement light path is adjusted by moving the stage 12. In addition, it is also possible to have a configuration in which the length of the reference light path may be variable by moving the reference mirror 224 in the light axis direction (i.e., the right-left direction in FIG. 3). Thus, in the interferometer optical head 152, the light path length of either the reference light path or the measurement light path is variable.

The interferometer optical head 152 is moved and scanned along the positions in the light axis direction by the driving mechanism section 26 under the control of the computer system 2, and the imaging section 25 performs imaging every time it moves a predetermined distance. The interference fringe images are sequentially transferred to and imported into the computer system 2.

Referring back to FIG. 1, the computer system 2 includes a computer main body 201, a keyboard 202, a joystick box (hereinafter referred to as a J/S) 203, a mouse 204, and a display 205. The computer system 2 determines the surface shape of the measurement target surface based on the interference fringe images acquired by the interferometer optical head 152. The computer system 2 serves as an analysis unit in the present invention.

Figure 4:
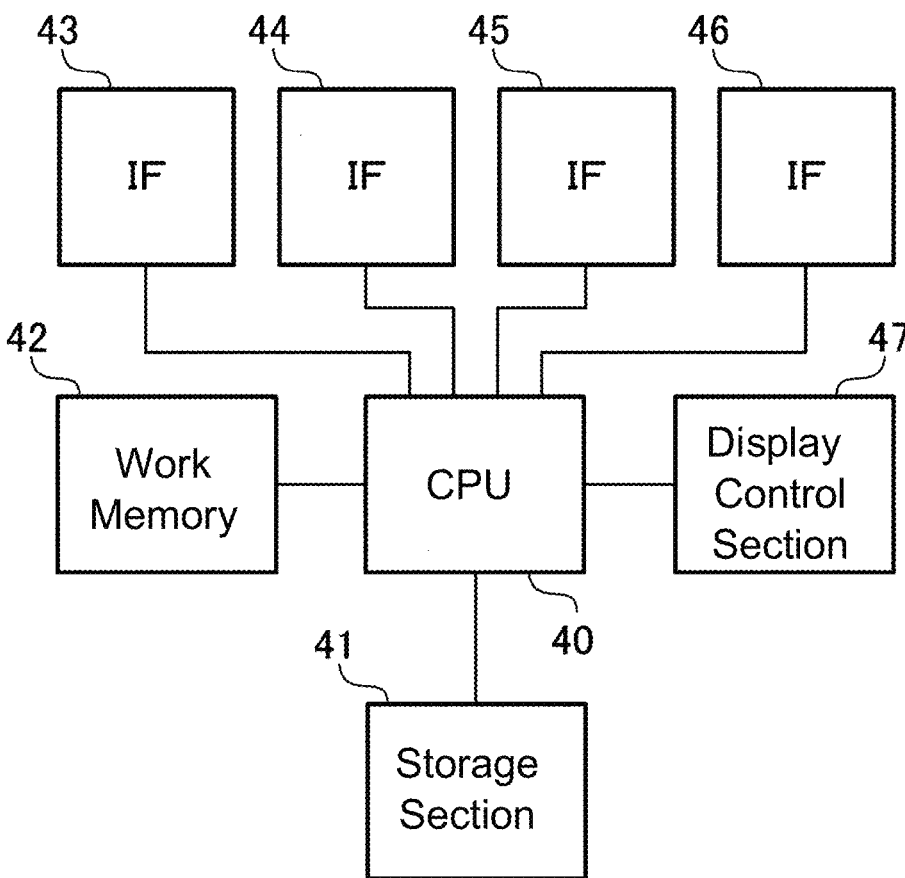
FIG. 4 is a block diagram showing a configuration of a computer main body 201.

FIG. 4 is a block diagram showing a configuration of the computer main body 201. As shown in FIG. 4, the computer main body 201 includes a CPU 40, which serves as the center of control, a storage section 41, a work memory 42, interfaces (denoted as "IF" in FIG. 4) 43, 44, 45, 46, and a display control section 47 that controls the display on the display 205.

Operator instruction information input from the keyboard 202, the J/S 203, or the mouse 204 is input to the CPU 40 via the interface 43. The interface 44 is connected to the image measurement machine 10, supplies various control signals from the CPU 40 to the image measurement machine 10, receives various status information, images, and the like, from the image measurement machine 10, and inputs them to the CPU 40.

When an image measurement mode is selected, the display control section 47 displays, on the display 205, an image formed by image signals supplied from the CCD camera in the image optical head 151. When a light interference measurement mode is selected, the display control section 47 displays, on the display 205, as needed, the image captured by the interferometer optical head 152, surface shape data measured by the interferometer optical head 152, and other data, based on the control by the CPU 40. The measurement results of the image optical head 151 and the interferometer optical head 152 can be output to the printer via the interface 45.

The work memory 42 provides a work area for various types of processing of the CPU 40. The storage section 41 is configured by, for example, a hard disk drive, a RAM, and the like, and stores programs to be executed by the CPU 40, the measurement results by the surface shape measurement device 1, and other data. The programs to be executed by the CPU 40 include a program that performs the analysis processing described below.

Based on various types of information input via the respective interfaces, the operator instructions, the programs stored in the storage section 41, and the like, the CPU 40 performs various types of processing including: switching between the image measurement mode using the image optical head 151 and the light interference measurement mode using the interferometer optical head 152: specifying the measurement range: moving the imaging unit 15 in the X-axis direction: moving the stage 12 in the Y-axis direction; imaging two-dimensional images by the image optical head 151: measuring interference fringe images by the interferometer optical head 152; and calculating the surface shape.

When calculating the surface shape, the CPU 40 identifies the moving scan position where the peak of the interference fringe occurs for each pixel position in the interference fringe image, and such moving scan position is considered as the height (i.e., the position in the Z-axis direction) of each pixel position in the interference fringe image.

Next, a method for determining the height at each pixel position in the interference fringe image using the surface shape measurement device 1 of the present embodiment will be described. In the following, N (where N≥2) interference fringe images will be acquired while scanning the interferometer optical head 152 in the Z-axis direction along the light axis from a start point (e.g., the position closest to the workpiece W in the scan range in the Z-axis direction) to an end point (e.g., the position farthest from the workpiece W in the scan range in the Z-axis direction). Then, the height (i.e., the position in the Z-axis direction) at each pixel position is determined based on the N interference fringe images acquired in this manner. The surface shape of the workpiece W can be grasped from the determined height of each pixel position.

(Rough Peak Detection Processing)

Figure 5A:
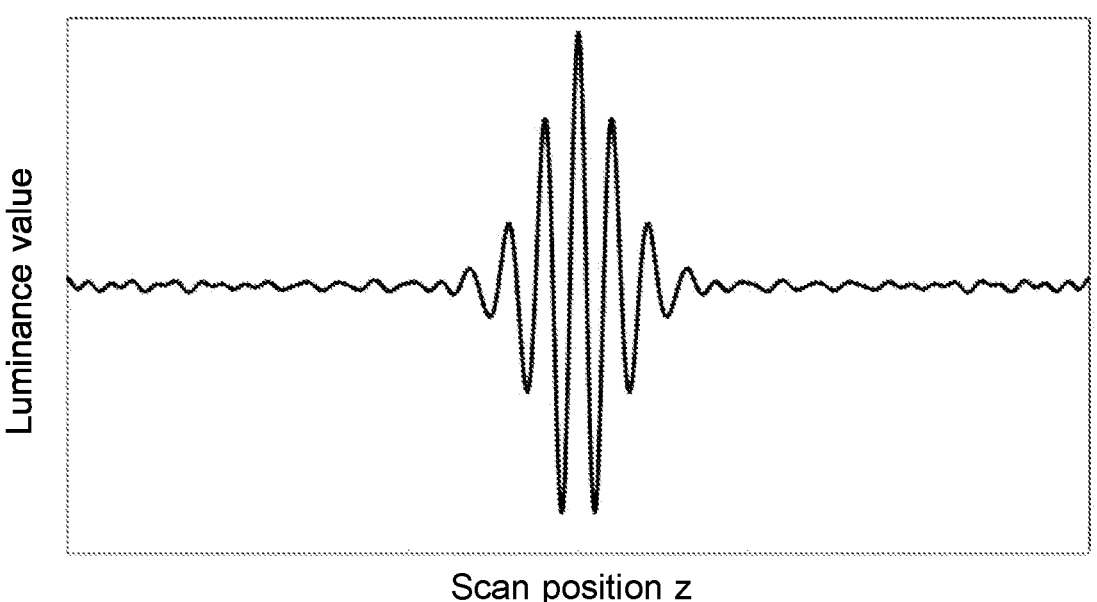
FIG. 5A shows an example of an interference signal.
Figure 5B:
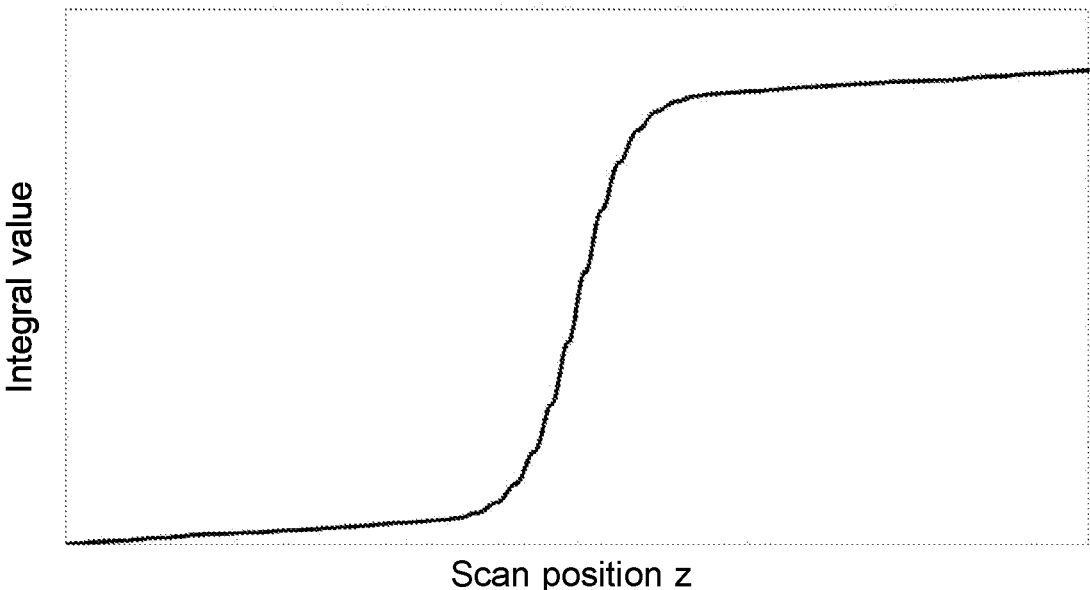
FIG. 5B shows an example of an integral curve w based on the interference signal.

First, the rough peak detection processing will be described. In the rough peak detection processing of the present embodiment, for a common pixel position in the N interference fringe images, a signal indicating the change in the interference light intensity at each imaged position (i.e., the luminance value of the pixel) along the Z-axis direction is considered as the interference signal (FIG. 5A), the square values of this interference signal or the absolute values of the interference signal is determined, and the height (i.e., the position in the Z-axis direction) at each pixel position is determined from the integral curve (FIG. 5B) obtained by integrating the square values or the absolute values.

Figure 6:
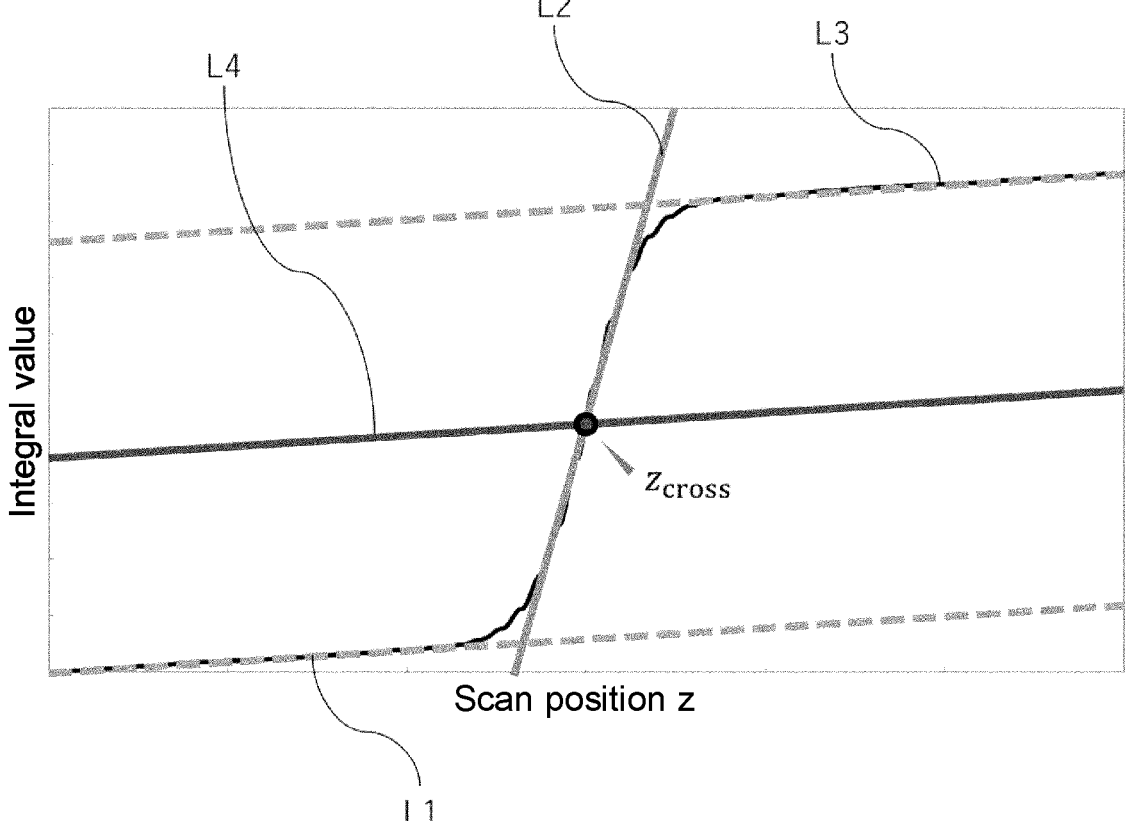
FIG. 6 is a diagram showing three straight lines (L1 to L3) that approximate the integral curve, an intermediate straight line L4 calculated from these straight lines, and the position $Z_{cross}$ at the measurement target surface.

In the method of the present embodiment, such integral curve is approximated by three straight lines consisting of a start-point-side noise part straight line L1, an interference part straight line L2, and an end-point-side noise part straight line L3, as shown in FIG. 6. The start-point-side noise part straight line L1 approximates a start-point-side noise part, which corresponds to the range without the occurrence of interference closer to the start point than to the measurement target surface. In addition, the end-point-side noise part straight line L3 approximates an end-point-side noise part, which corresponds to the range without the occurrence of interference closer to the end point than to the measurement target surface. Moreover, the interference part straight line L2 approximates the interference part, which corresponds to the range with the occurrence of interference in the vicinity of the measurement target surface.

The start-point-side noise part straight line L1 may be determined based on a predetermined number of points (e.g., ten points) from the start point of the integral curve. The end-point-side noise part straight line L3 may be determined based on a predetermined number of points (e.g., ten points) from the end point of the integral curve. In addition, the start-point-side noise part straight line L1 and the end-point-side noise part straight line L3 may be determined under the restriction that the slopes of the start-point-side noise part straight line L1 and the end-point-side noise part straight line L3 are equal.

The interference part straight line L2 may be a straight line with the maximum slope out of approximate straight lines for a predetermined number of consecutive points in the integral curve. For example, the approximate straight lines may be determined by applying the least squares method to all of the predetermined number of consecutive points. Alternatively, the straight line connecting the points at the ends of the predetermined number of consecutive points may be set as the approximate straight line.

Then, the position (height) in the Z-axis direction of the measurement target surface is determined based on the start-point-side noise part straight line L1, the end-point-side noise part straight line L3, and the interference part straight line L2. Specifically, an intermediate straight line L4 is determined, the intermediate straight ling L4 having a slope obtained by averaging the slope of the start-point-side noise part straight line L1 and the slope of the end-point-side noise part straight line L3, and having an intercept obtained by averaging the intercept of the start-point-side noise part straight line and the intercept of the end-point-side noise part straight line. Then, the intersection point $Z_{cross}$ between the intermediate straight line L4 and the interference part straight line L2 is determined, and the position of this intersection point is defined as the position (height) in the Z-axis direction $Z_R$ of the measurement target surface.

The surface shape of the workpiece W may be obtained by applying the above-described method to all pixels in the interference fringe image and obtaining the positions in the Z-axis direction $Z_R$.

The position in the Z-axis position $Z_R$ of the measurement target surface is determined from the integral curve by the above-described method, but the analysis processing for determining the height at the pixel position may be started before all N points constituting the integral curve are obtained (i.e., before the N interference fringe images are imaged). In the following, with reference to the flowchart shown in FIG. 7, a method will be described for performing at least part of the analysis processing, before all N interference fringe images are obtained, by using interference fringe images that are already stored in the computer system 2 while imaging interference fringe images by the interferometer optical head 152 and importing them into the computer system 2. With this method, a reduction in the processing time and the processing load can be achieved.

As described above, in the surface shape measurement device 1, N (where N≥2) interference fringe images are sequentially imaged while scanning from the start point to the end point in the Z-axis direction along the light axis of the interferometer optical head 152, and the images are transferred to the computer system 2. In the rough peak detection processing according to the present method, when the measurement starts, the surface shape measurement device 1 first acquires the first interference fringe image (step S10). Then, the M-th interference fringe image (where 2≤M≤N) is sequentially acquired while the position of the interferometer optical head 152 is scanned, and, in parallel thereto, the computer system 2 implements analysis processing on the interference fringe images up to the M−1-th image (step S20).

The analysis processing for the interference fringe images up to the M−1-th image includes integral curve update processing (step S21) for determining the values of the points from the start point to the M−1-th point constituting the integral curve for each position in the lastly acquired M−1-th interference fringe image. This integral curve update processing is processing in which, for each position in the M−1-th interference fringe image, the value of the M−1-th point in the integral curve is determined by adding the square value of the luminance value to the integral value up to the M−2-th image. The initial value of the integral value (i.e., the integral value up to the M−2=0-th image, to which the square value of the luminance value is added, when M=2) is 0.

In addition, the analysis processing for the interference fringe images up to the M−1-th image includes latest approximate straight line calculation processing (step S22) for determining the approximate straight line for a predetermined number of consecutive points including the M−1-th point of the integral curve as the point closest to the end point. If M−1 fails to satisfy the predetermined number, the latest approximate straight line calculation processing may not need to be carried out.

In addition, the analysis processing for the interference fringe images up to the M−1-th image includes tentative interference part straight line update processing (step S23) for determining the tentative interference part straight line with the maximum slope out of approximate straight lines for the predetermined number of consecutive points up to the M−1-th point in the integral curve. In this tentative interference part straight line update processing, the tentative interference part straight line determined for the points up to the M−2-th point in the integral curve is compared with the approximate straight line determined in the latest approximate straight line calculation processing, and the one with the greater slope is determined as the new tentative interference part straight line. If M−1 fails to satisfy the predetermined number, the tentative interference part straight line update processing may not need to be carried out.

In this way, part of the processing for determining the height of the measurement target surface can be proceeded before acquiring all of the N interference fringe images by proceeding with the analysis processing of the already-acquired interference fringe images up to the M−1-th image while acquiring the M-th interference fringe image.

After step S20, if the N-th interference fringe image has not yet been acquired (step S30; No), the flowchart goes back to step S20 and the analysis processing is performed on the already-acquired interference fringe images while acquiring the next interference fringe image.

After repeating step S20 until the N-th interference fringe image is acquired (step S30; Yes), the analysis processing (step S40) is performed on the first interference fringe image through the N-th interference fringe image. The analysis processing performed on the first interference fringe image through the N-th interference fringe image includes: the integral curve update processing (step S41) for determining the value of the N-th point in the integral curve: the latest approximate straight line calculation processing (step S42); and the tentative interference part straight line update processing (step S43). The tentative interference part straight line obtained in the tentative interference part straight line update processing in the analysis processing performed on the first interference fringe image through the N-th interference fringe image is determined as the interference part straight line.

In this way, when the N-th interference fringe image is acquired, the integral curve up to the already-acquired N−1-th point and the tentative interference part straight line based on the integral curve up to the N−1-th point can already be determined. Then, after acquiring the N-th interference fringe image, the entire integral curve can be established only by determining the N-th point (i.e., the last point) in the integral curve.

In addition, the final interference part straight line can be obtained only by determining the approximate straight line including the N-th point, comparing it with the tentative interference part straight line based on the integral curve up to the N−1-th point, and making a selection.

In addition, in the analysis processing after acquiring the N-th interference fringe image, the start-point-side noise part straight line L1 and the end-point-side noise part straight line L3 are determined (step S44) based on a predetermined number of points from the start point in the integral curve and a predetermined number of points from the end point in the integral curve.

If there is no restriction to the effect that the slopes of the start-point-side noise part straight line L1 and the end-point-side noise part straight line L3 are equal, when M−1 matches the number of points necessary to determine the start-point-side noise part straight line L1, the start-point-side noise part straight line L1 may be determined in the analysis processing for the interference fringe images up to the M−1-th image and the end-point-side noise part straight line L3 may be determined in the analysis processing after the N-th interference fringe image has been acquired.

In the analysis processing after the N-th interference fringe image has been acquired, the intermediate straight line is subsequently determined from the start-point-side noise part straight line L1 and the end-point-side noise part straight line L3 (step S45). Further, the intersection point between the intermediate straight line and the interference part straight line is determined, and the position $Z_{cross}$ of this intersection point is defined as the position (height) in the Z-axis direction $Z_R$ of the measurement target surface (step S46).

In this way, after the interference part straight line has been determined, the height of the measurement target surface can be determined by processing with relatively low processing load and that does not require a large amount of work memory, such as straight-line approximation with relatively few points and calculation of the intersection point of the straight lines.

As described above, the surface shape measurement device 1 according to the present embodiment can suppress the work memory and computational power necessary for analysis processing in the rough peak detection processing. In addition, the measurement time can be reduced by performing the capturing and the analysis processing of the interference fringe images in parallel.

(Fine Peak Detection Processing)

Next, the fine peak detection processing will be described. In the fine peak detection processing of the present embodiment, the relative position (height) in the Z-axis direction of the measurement target surface is accurately identified by focusing on the phase of the interference signal.

As described above, the light with low coherency (i.e., incoherent light) emitted from the light-emitting section 20 is light with coherence that is intentionally lowered and in which light rays with various wavelengths are mixed at a constant proportion, as represented by white light. Because multiple wavelengths are mixed in the incoherent light, an interference fringe occurs only when the length of the measurement light path involving the reflection at the workpiece W and the reference light path involving the reflection at the reference mirror are approximately equal.

However, because the incoherent light emitted from the light-emitting section 20 has a wide wavelength band, if the wavelength band distribution contained in the reflected light changes due to the color and/or shape of the workpiece surface, it is directly linked to the distortion of the interference signal and becomes a factor for measurement error. In addition, phases are difficult to define in the incoherent light with multiple wavelength components. Due to these factors, it cannot be said that the phase obtained by directly analyzing the interference signals produced by the incoherent light is of high precision. Therefore, in the fine peak detection processing in the present embodiment, components of a specific analysis wavelength Λ are extracted from the wavelength band of the light source and analyzed. Then, the relative position (height) in the Z-axis direction of the measurement target surface can be accurately determined from the phase of such analysis wavelength obtained in this way. The relative position here refers to the position within the range of one wavelength of the analysis wavelength Λ.

For performing phase analysis on a specific analysis wavelength Λ of the wavelength components contained in the incoherent light emitted from the light-emitting section 20, a Fourier transform is performed on the interference signal and the analysis is performed on the analysis wavelength Λ contained in the interference signal. The Fast Fourier Transform (FFT) is used in the conventional fine peak detection processing as a way to perform the Fourier transform on the interference signal. The FFT can perform high-speed operations with low computational amount due to convolution, but it has a restriction to the effect that the number of data points must be $2^n$, and the intervals must be a periodic function. If the interval is not periodic, it is known to use a window function to blur the beginning and end of the interval to bring it to a pseudo periodic function. However, when the window function is used, the occurrence of analysis errors is unavoidable. Therefore, in the present embodiment, a Discrete Fourier Transform (DFT) is used for performing phase analysis on the analysis wavelength $\Lambda$. Since the DFT does not involve convolution, the restriction as to the number of data points is relaxed. On the other hand, the DFT is known to take more time to calculate than FFT, but in the present embodiment, the DFT is applied only to the selected analysis wavelength $\Lambda$, so the increase in the calculation time is limited.

In the interference optical system of the interferometer optical head 152, when the interferometer optical head 152 is displaced, the light path length of both the entering light path to the workpiece W and the reflected light path changes. As a result, the light path difference is twice the displacement amount of the interferometer optical head 152 by the time reaching the imaging section 25. Therefore, the wavelength of the interference light is half the light source wavelength, and if the light source wavelength is $\lambda$ and the analysis wavelength contained in the interference signal is $\Lambda$, the relation is $\Lambda=\lambda/2$.

In the following, the case where the analysis is performed on the analysis wavelength $\Lambda$ contained in the interference signal will be considered.

The shape error of the surface shape measurement by the above-described method tends to be smaller as the intensity of the interference signal detected at the imaging section 25 is greater. Therefore, the analysis wavelength $\Lambda$ should be selected from the vicinity of the wavelength at which the intensity of the interference signal detected by the imaging section 25 is at a maximum. For example, $\Lambda$ is preferably between 260 nm and 400 nm, more preferably between 290 nm and 350 nm, and particularly preferably 320 nm.

The definition equation for performing a Fourier transform on the data function f(z) of the interference signal is shown in Equation (6):

$$F\left(\Lambda^{-1}\right) = \int_{-\infty}^{+\infty} f(z)e^{-i\frac{2\pi}{\Lambda}z}dz \tag{6}$$

Suppose that the interferometer optical head 152 acquires images at equal intervals at a scan pitch $z_p$. If n is the imaging number of the interference light image, z in Equation (6) can be replaced by $n \cdot z_p$, and Equation (6) can be transformed into a discrete sum as in Equation (7):

$$F\left(\Lambda^{-1}\right) = \sum_{n=1}^{N} f(n \cdot z_p)e^{-i\frac{2\pi}{\Lambda}n \cdot z_p} \tag{7}$$

By introducing the integer number $\xi$ and the total number of imaged images N, and replacing $\Lambda$ with $N \cdot z_p/\xi$ Equation (7) can be transformed into Equation (8):

$$F\left(\frac{\xi}{N \cdot z_p}\right) = \sum_{n=1}^{N} f(n \cdot z_p)e^{-i\frac{2\pi\xi n}{N}} \tag{8}$$

For example, consider the case where the total number of imaged images N=500 and the scan pitch $z_p$=50 nm, and the analysis is performed in the vicinity of $\Lambda$=300 nm. In this case, $\xi$ and $\Lambda$ are selected so that $\Lambda=N \cdot z_p/\xi$. Ideally, light at exactly $\Lambda$=300 nm should be analyzed. However, since the DFT has a restriction to the effect that only wavelengths with discrete values of $\Lambda=50\times500/\xi$ can be handled, $\Lambda$=301.205 nm ($\xi$=83) is selected in order to minimize the error. Substituting Equation (8) with N=500, $z_p$=50 nm, and $\xi$=83 results in Equation (9):

$$F\left(\frac{83}{500 \cdot 50}\right) = F(301.205 \ldots^{-1}) = \sum_{n=1}^{500} f(50n) \cdot e^{-i2\pi \cdot 0.166 \cdot n} \tag{9}$$

$F(\Lambda^{-1})$ is a complex number and can be expressed as $F(\Lambda^{-1})=a+bi$. In this case, the intensity of the interference fringe produced by the light at the analysis wavelength $\Lambda$ is calculated as $I=|F(\Lambda^{-1})|^2=|a+bi|^2=a^2+b^2$. The phase thereof is calculated as the argument of $F(\Lambda^{-1})$, as in Equation (10):

$$\phi = \arg[F(\Lambda^{-1})] = \arctan\left(\frac{b}{a}\right) \tag{10}$$

The relative position (height) in the Z-axis direction $Z_{FA}$ determined from the interference signal is determined by converting the phase determined with Equation (10) to the length dimension by way of Equation (1):

$$Z_{FA} = \phi \times \frac{\Lambda}{2\pi} \tag{1}$$

The position in the Z-axis position $Z_{FA}$ of the measurement target surface in the fine peak detection processing may be determined by the above-described method, but the analysis processing for determining the height at the pixel position may be started before all N points constituting the interference signal are obtained (i.e., before the N interference fringe images are imaged). In the following, with reference to the flowchart shown in FIG. 8, a method will be described for performing at least part of the analysis processing, before all N interference fringe images are obtained, by using interference fringe images that are already stored in the computer system 2 while imaging interference fringe images by the interferometer optical head 152 and importing them into the computer system 2. With this method, a reduction in the processing time and the processing load can be achieved. In addition, this fine peak detection processing can be implemented in parallel with the previously-described rough peak detection processing.

As described above, in the surface shape measurement device 1, N (where N≥2) interference fringe images are sequentially imaged while scanning from the start point to the end point in the Z-axis direction along the light axis of the interferometer optical head 152, and the images are transferred to the computer system 2. In the fine peak detection processing according to the present method, when the measurement starts, the surface shape measurement device 1 first acquires the first interference fringe image (step S110). Then, the M-th interference fringe image (where 2≤M≤N) is sequentially acquired while the position of the interferometer optical head 152 is scanned, and, in parallel thereto, the computer system 2 implements analysis processing on the interference fringe images up to the M−1-th image (step S120).

The analysis processing on the interference fringe images up to the M−1-th image includes at least the Fourier transform processing (step S121). In this Fourier transform processing, for each position in the lastly acquired K-th interference fringe image, the value of Equation (3) is calculated:

$$f(K \cdot z_p) e^{-i\frac{2\pi}{\Lambda} K \cdot z_p} \tag{3}$$

and this value is added to Equation (4), which is the discrete sum of the Fourier transform $F(\Lambda^{-1})$ which has been determined for the points up to the K−1-th point:

$$\sum_{n=1}^{K-1} f(n \cdot z_p) e^{-i\frac{2\pi}{\Lambda} n \cdot z_p} \tag{4}$$

Thereby, Equation (5) is calculated, which is the discrete sum of the Fourier transform $F(\Lambda^{-1})$ at the analysis wavelength $\Lambda$ for the points up to the K-th point. The initial value of the discrete sum is 0.

$$\sum_{n=1}^{K} f(n \cdot z_\rho) e^{-i\frac{2\pi}{\Lambda} n \cdot z_p} \tag{5}$$

After step S120, if the N-th interference fringe image has not yet been acquired (step S130; No), the flowchart goes back to step S120 and the analysis processing is performed on the already-acquired interference fringe images while acquiring the next interference fringe image.

After repeating step S120 until the N-th interference fringe image is acquired (step S130; Yes), the analysis processing (step S140) is performed on the first interference fringe image through the N-th interference fringe image. The analysis processing on the first interference fringe image through the N-th interference fringe image includes Fourier transform processing similar to the above (step S141). The discrete sum obtained by the Fourier transform processing in the analysis processing after acquiring the N-th interference fringe image is the Fourier transform $F(\Lambda^{-1})$ at the analysis wavelength $\Lambda$ of the interference signal f(z).

In addition, in the analysis processing on the first interference fringe image through the N-th interference fringe image, the phase of $F(\Lambda^{-1})$ is calculated by the above-described Equation (5) (step S142), and the coordinate (height) $Z_{FA}$ of the measurement target surface is determined by the above-described Equation (1) (step S143).

In this way, when the N-th interference fringe image is acquired, the discrete sum of the Fourier transform $F(\Lambda^{-1})$ at the analysis wavelength $\Lambda$ of the already-acquired points up to the N−1-th point can already be determined. Then, after acquiring the N-th interference fringe image, the Fourier transform $F(\Lambda^{-1})$ at the analysis wavelength $\Lambda$ of the interference signal f(z) can be established only by reflecting the N-th point (i.e., the last point) in the discrete sum of the Fourier transform $F(\Lambda^{-1})$. In this way, the relative position of the measurement target surface can be determined by performing the fine peak detection processing by processing with relatively low processing load and that does not require a large amount of work memory.

As described above, the surface shape measurement device 1 according to the present embodiment can suppress the work memory and computational power necessary for analysis processing in the fine peak detection processing. In addition, the measurement time can be reduced by performing the capturing and the analysis processing of the interference fringe images in parallel.

Figure 7:
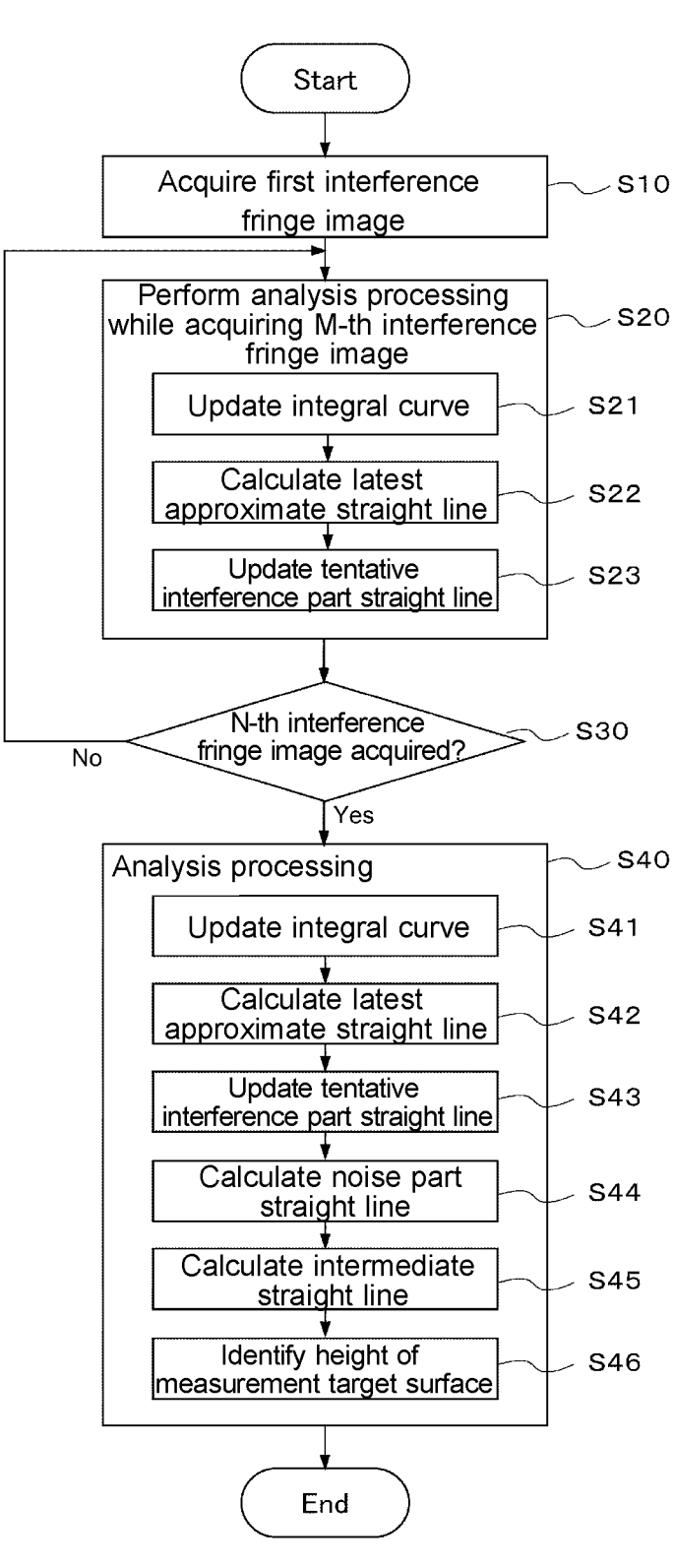
FIG. 7 is a flowchart showing an example of the procedures of rough peak detection processing in the surface shape measurement of the present embodiment.
Figure 8:
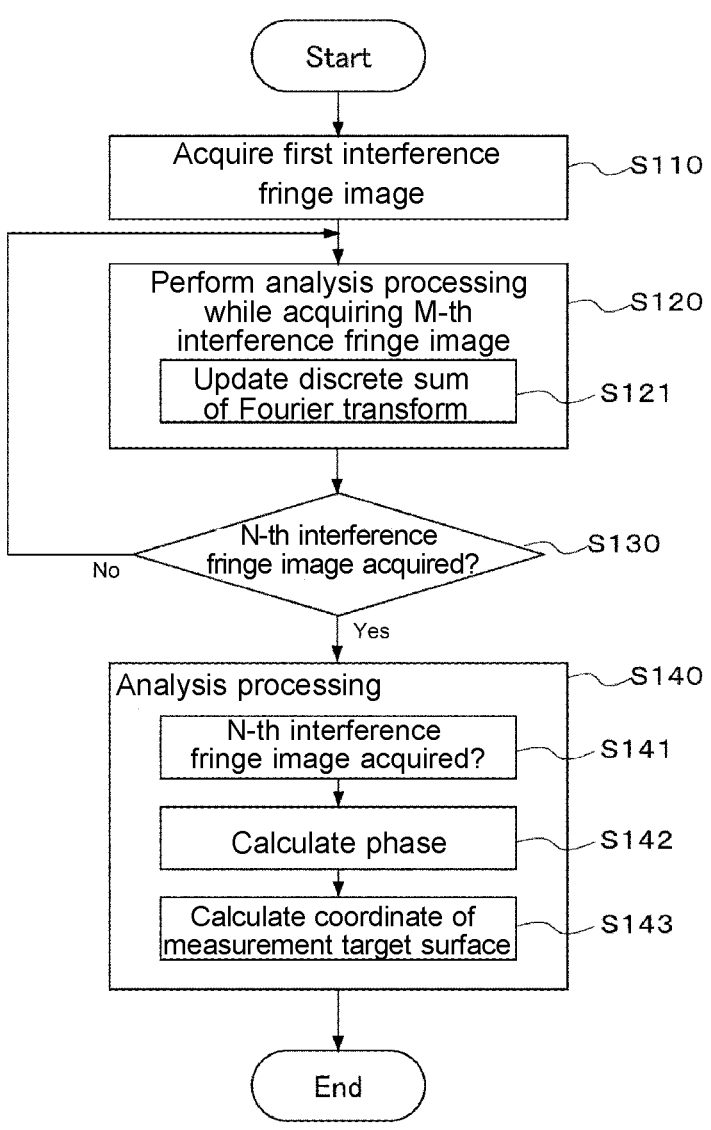
FIG. 8 is a flowchart showing an example of the procedures of fine peak detection processing in the surface shape measurement of the present embodiment.

The analysis processing in the fine peak detection processing shown in the flowchart shown in FIG. 8 can be performed in parallel with the analysis processing in the rough peak detection processing shown in the flowchart shown in FIG. 7. More specifically step S20 in FIGS. 7 and S120 in FIG. 8 can be performed in parallel, and step S40 in FIGS. 7 and S140 in FIG. 8 can be performed in parallel. Accordingly, after acquiring the N-th interference fringe image, the coordinate (height) $Z_R$ of the measurement target surface through the rough peak detection and the relative position (height) in the Z-axis direction $Z_{FA}$ of the measurement target surface through the fine peak detection can be determined with little processing.

(Combining Rough Peak Detection and Fine Peak Detection)

In the above-described fine peak detection processing, the position in the Z-axis direction is identified based on the phase φ of the interference signal at a specific analysis wavelength $\Lambda$, so the position identified is the relative position in the Z-axis direction $Z_{FA}$ of the measurement target surface within the range of the analysis wavelength. Therefore, the range of heights that can be identified in the fine peak detection processing alone is limited to the range between −$\Lambda$/2 to +$\Lambda$/2. In other words, if the absolute position (true position) $Z_S$ of the measurement target surface is expressed as $Z_S = \Lambda \times m + Z_{FA}$ with m as an integer, the absolute position $Z_S$ can be determined from the relative position $Z_{FA}$ determined in the fine peak detection processing if the integer m is identified.

Therefore, based on the height $Z_R$ determined by the rough peak detection processing, an optimum m is determined by Equation (11):

$$m = \text{round}\left(\frac{Z_R - Z_{F\Lambda}}{\Lambda}\right) \tag{11}$$

In other words, m is an integer closest to $(Z_R - Z_{FA})/\Lambda$.

Using the m determined in this way, the absolute position $Z_S$ of the measurement target surface can be determined by $Z_S = \Lambda \times m + Z_{FA}$.

Thus, when determining the absolute position of the measurement target surface using Equation (11), it is necessary to perform division. In most arithmetic devices (especially arithmetic devices that are unable to perform floating-point processing), division is performed with a fixed point, but division with a fixed point takes time as it involves multiple processing steps. In order to solve this problem, when k is an aliquot part of the scan pitch $z_p$ (i.e., k is a value whose integer multiples of 2 or more are the scan pitch $z_p$), it is preferable to select the analysis wavelength $\Lambda$ to be $k \times 2^n$.

In Equation (11), suppose $Z_R = Z_{R\_index} \cdot z_p$ and $Z_{FA} = Z_{FA\_phase} \cdot \Lambda$. Where $Z_{R\_index}$ is an integer representing how many times $Z_R$ is the scan pitch $z_p$, and $Z_{FA}$ phase is the phase of light at the analysis wavelength $\Lambda$ (equivalent to $\Phi/2\pi$ determined from $\Phi$ in Equation (1) or (10)).

In this case, using k, which is the aliquot part of the scan pitch $z_p$, $z_p = k \cdot z_p'$ can be expressed. Then, if the analysis wavelength $\Lambda$ is selected so that $\Lambda=2^n \cdot k$, Equation (11) can be transformed into Equation (12).

$$m = \text{round}\left(\frac{(z_{R\_index} \cdot z_p) - (z_{FA\_phase} \cdot \Lambda)}{\Lambda}\right) \quad (12)$$

$$= \text{round}\left(\frac{(z_{R\_index} \cdot z'_p \cdot k) - (z_{FA\_phase} \cdot 2^n \cdot k)}{2^n \cdot k}\right)$$

$$= \text{round}\left(\frac{(z_{R\_index} \cdot z'_p) - (z_{FA\_phase} \cdot 2^n)}{2^n}\right)$$

Thus, if the analysis wavelength $\Lambda$ is selected so that $\Lambda=2^n \cdot k$, then the division for determining m uses $2^n$ as the divisor. In general, in arithmetic devices, divisions using $2^n$ as a divisor can be replaced by an n-bit bit-shift operation, and so by using such analysis wavelength $\Lambda$, the division that takes time due to involving multiple processing steps can be eliminated and a reduction in the processing time can be achieved.

(Modification of Embodiments)

It should be noted that the present invention is not limited to the above-described embodiments, and any variation, improvement, and the like, are included in the present invention to the extent that the object of the present invention can be achieved.

For example, in the above-described embodiment, an image measurement device using a Michelson-type interferometer was described as an example, but the present invention can be applied to various measurement devices, microscopes, and/or the like, using an interferometer, other than the image measurement device. The present invention can also be applied to measurement devices using an equal-light path interferometer, such as a Millau-type, a Fiseau-type, a Twyman-Green-type, or another type.

In the above-described embodiments, the analysis processing in the rough peak detection processing and the fine peak detection processing was performed by the computer system 2, but some or all of the analysis processing may be realized by dedicated hardware using ASICs and/or FPGAs.

In addition, in the above-described embodiments, the absolute position $Z_S$ was determined from the relative position $Z_{FA}$ obtained by the fine peak detection processing and the position $Z_R$ obtained by the rough peak detection processing, but the absolute position $Z_S$ may also be determined from the relative position $Z_{FA}$ and the position determined by a method different from the above-described method. For example, the absolute position $Z_S$ may be determined from the position obtained by the conventional rough peak detection method and the relative position $Z_{FA}$ obtained by the above-described fine peak detection processing.

It should be noted that embodiments obtained by those skilled in the art appropriately performing addition, deletion and/or design change of components on the above-described respective embodiments and embodiments obtained by those skilled in the art appropriately combining the features of the respective embodiments, are also encompassed in the scope of the present invention, provided that they include the gist of the present invention.

INDUSTRIAL APPLICABILITY

The present invention is capable of reducing the number of images captured of interference fringe images and the measurement time, by being applied to a light interference measurement device.

The invention claimed is:

1. A measurement method of a surface shape, comprising:

using an interferometer optical head to divide, by a beam splitter, incoherent light applied from a light source into reference light to a reference mirror and measurement light to a measurement target surface;

acquiring an interference fringe image, by an imaging element of the interferometer optical head, generated by a light path difference between light reflected from the reference mirror and light reflected from the measurement target surface;

acquiring N (where $N \geq 2$) interference fringe images while scanning the interferometer optical head, with respect to the measurement target surface, from a start point to an end point in the Z-direction along a light axis of the interferometer optical head; and measuring a surface shape of the measurement target surface, in parallel with the acquiring of N interference fringe images, based on a repeated updating of an analysis processing of the N interference fringe images, wherein, for a common position in the N interference fringe images, regarding an interference signal consisting of values of N points that indicates a change in interference light intensity along the Z-axis direction, a phase $\phi$ of an interference fringe produced by light at a predetermined analysis wavelength $\Lambda$ is determined, and a relative position $Z_{FA}$ in the Z-axis direction of the measurement target surface within the range of the analysis wavelength is identified based on the phase $\phi$, wherein a Fourier transform $F(\Lambda^{-1})$ at the analysis wavelength $\Lambda$ of the interference signal $f(z)$ is determined based on Equation (2):

$$F^1(\Lambda^{-1}) = \sum_{n=1}^{N} f(n \cdot z_p) e^{-i\frac{2\pi}{\Lambda} n \cdot z_p} \quad (2)$$

where a scan pitch in the Z-axis direction is $z_p$ and an order of a data point counted from the start point is n-th, and the phase $\phi$ of the interference fringe produced by the light at the analysis wavelength $\Lambda$ is determined based on an argument of the $F(\Lambda^{-1})$, in which $F(\Lambda^{-1})$ is obtained as a complex number, wherein, after acquiring the first interference fringe image, the analysis processing is performed on the interference fringe images up to the M−1-th image while sequentially acquiring the M-th (where $2 \leq M \leq N$) interference fringe image, and after acquiring the N-th interference fringe image, the analysis processing is performed on the first interference fringe image through the N-th interference fringe image, and wherein the analysis processing includes Fourier transform processing in which: the value of Equation (3):

$$f(K \cdot z_p) e^{-i\frac{2\pi}{\Lambda} K \cdot z_p} \quad (3)$$

19
20 is calculated, at least, for each position in a most recently acquired K-th interference fringe image, this value is added to Equation (4):

$$\sum_{n=1}^{K-1} f(n \cdot z_p) e^{-i\frac{2\pi}{\Lambda} n \cdot z_p} \tag{4}$$

which is a discrete sum of the Fourier transform $F(\Lambda^{-1})$, which has been determined for the points up to the point K−1-th, and thereby, Equation (5):

$$\sum_{n=1}^{K} f(n \cdot z_p) e^{-i\frac{2\pi}{\Lambda} n \cdot z_p} \tag{5}$$

is calculated, which is a discrete sum of the Fourier transform $F(\Lambda^{-1})$ at the analysis wavelength $\Lambda$ for the points up to the K-th point; and the discrete sum obtained by the Fourier transform processing in the analysis processing performed after acquiring the N-th interference fringe image is the Fourier transform $F(\Lambda^{-1})$ at the analysis wavelength $\Lambda$ of the interference signal f(z), wherein, when an absolute position $Z_S$ in the Z-axis direction of the measurement target surface is expressed as $Z_S = \Lambda \times m + Z_{FA}$ with m as an integer, the integer m is identified based on a position $Z_R$ in the Z-axis direction of the measurement target surface obtained by a method different from the calculation of the relative position $Z_{FA}$, and the absolute position $Z_S$ is calculated using $Z_S = \Lambda \times m + Z_{FA}$, wherein, from an integral curve consisting of values of N points, which is obtained by integrating square values or absolute values of the interference signal: a start-point-side noise part straight line that approximates a start-point-side noise part, which corresponds to a range without the occurrence of interference closer to the start point than to the measurement target surface; an end-point-side noise part straight line that approximates an end-point-side noise part, which corresponds to a range without the occurrence of interference closer to the end point than to the measurement target surface; and an interference part straight line that approximates an interference part, which corresponds to a range with the occurrence of interference in the vicinity of the measurement target surface, are determined, wherein the position $Z_R$ in the Z-axis direction of the measurement target surface is determined based on the start-point-side noise part straight line, the end-point-side noise part straight line, and the interference part straight line, and the position determination of $Z_R$ in the Z-axis direction is determined for each pixel in the interference fringe images to obtain the surface shape of the measurement target, and wherein the incoherent light applied by the light source is light having a coherency that is intentionally lowered such that a coherence length is 100 μm or less, and light rays with various wavelengths in the light are mixed at a constant proportion.

2. The measurement method according to claim 1, wherein the relative position $Z_{FA}$ in the Z-axis direction of the measurement target surface is calculated by Equation (1):

$$Z_{FA} = \phi \times \frac{\Lambda}{2\pi} \tag{1}$$

3. The measurement method according to claim 1, wherein the $F(\Lambda^{-1})$ is determined by a discrete Fourier transform by selecting $\xi$ and $\Lambda$ so that $\Lambda = N \cdot z_p / \xi$ with $\xi$ as an integer.

4. The measurement method according to claim 1, wherein m is an integer closest to $(Z_R - Z_{FA})/\Lambda$.

5. The measurement method according to claim 4, wherein the analysis wavelength $\Lambda$ is selected so as to be $k \times 2^n$ (where k is a length that is multiplied by an integer 2 to the s-th power (s being a number) to yield the scan pitch $z_p$).

6. The measurement method according to claim 1, wherein the analysis wavelength $\Lambda$ is selected from the vicinity of a wavelength at which signal intensity is at a maximum when light applied from the light source is received at a light-receiving element for imaging the interference fringe image.

7. The measurement method according to claim 1, wherein the analysis wavelength $\Lambda$ is between 290 nm and 350 nm, inclusive.

8. The measurement method according to claim 7, wherein the analysis wavelength $\Lambda$ is 320 nm.

9. A surface shape measurement device for measuring a surface shape of a measurement target surface of a measurement target, comprising:

an interferometer optical head that divides, by a beam splitter, light applied from a light source that applies incoherent light into reference light to a reference mirror and measurement light to the measurement target surface, and acquires, by an imaging element, an interference fringe image generated by a light path difference between light reflected from the reference mirror and light reflected from the measurement target surface; and a computer, including at least a processor, configured to determine the surface shape of the measurement target surface, in parallel with the imaging element acquiring the interference fringe image, based on a repeated updating of an analysis processing by the computer of the interference fringe image acquired by the interferometer optical head, wherein the interferometer optical head acquires N (where N≥2) interference fringe images while scanning, with respect to the measurement target surface, from a start point to an end point in the Z-axis direction along a light axis of the interferometer optical head, wherein, for a common position in the N interference fringe images acquired by the interferometer optical head, the computer determines, regarding an interference signal consisting of values of N points that indicate a change in interference light intensity along the Z-axis direction, a phase $\phi$ of an interference fringe produced by light at a predetermined analysis wavelength $\Lambda$, and identifies a relative position $Z_{FA}$ in the Z-axis direction of the measurement target surface within the range of the analysis wavelength based on the phase $\phi$, wherein a Fourier transform $F(\Lambda^{-1})$ at the analysis wavelength $\Lambda$ of the interference signal f(z) is determined based on Equation (2):

$$F^1(\Lambda^{-1}) = \sum_{n=1}^{N} f(n \cdot z_p) e^{-i\frac{2\pi}{\Lambda} n \cdot z_p} \tag{2}$$

where a scan pitch in the Z-axis direction is $z_p$ and an order of a data point counted from the start point is n-th, and the phase $\phi$ of the interference fringe produced by the light at the analysis wavelength $\Lambda$ is determined based on an argument of the $F(\Lambda^{-1})$, in which $F(\Lambda^{-1})$ is obtained as a complex number, wherein, after acquiring the first interference fringe image, the analysis processing is performed on the interference fringe images up to the M−1-th image while sequentially acquiring the M-th (where $2 \leq M \leq N$) interference fringe image, and after acquiring the N-th interference fringe image, the analysis processing is performed on the first interference fringe image through the N-th interference fringe image, and wherein the analysis processing includes Fourier transform processing in which: the value of Equation (3):

$$f(K \cdot z_p)e^{-i\frac{2\pi}{\Lambda}K \cdot z_p} \tag{3}$$

is calculated, at least, for each position in a most recently acquired K-th interference fringe image, this value is added to Equation (4):

$$\sum_{n=1}^{K-1} f(n \cdot z_p)e^{-i\frac{2\pi}{\Lambda}n \cdot z_p} \tag{4}$$

which is a discrete sum of the Fourier transform $F(\Lambda^{-1})$, which has been determined for the points up to the point K−1-th, and thereby, Equation (5):

$$\sum_{n=1}^{K} f(n \cdot z_p)e^{-i\frac{2\pi}{\Lambda}n \cdot z_p} \tag{5}$$

is calculated, which is a discrete sum of the Fourier transform $F(\Lambda^{-1})$ at the analysis wavelength $\Lambda$ for the points up to the K-th point; and the discrete sum obtained by the Fourier transform processing in the analysis processing performed after acquiring the N-th interference fringe image is the Fourier transform $F(\Lambda^{-1})$ at the analysis wavelength $\Lambda$ of the interference signal f(z), wherein, when an absolute position $Z_S$ in the Z-axis direction of the measurement target surface is expressed as $Z_S=\Lambda \times m + Z_{FA}$ with m as an integer, the integer m is identified based on a position $Z_R$ in the Z-axis direction of the measurement target surface obtained by a method different from the calculation of the relative position $Z_{FA}$, and the absolute position $Z_S$ is calculated using $Z_S=\Lambda \times m + Z_{FA}$ wherein, from an integral curve consisting of values of N points, which is obtained by integrating square values or absolute values of the interference signal: a start-point-side noise part straight line that approximates a start-point-side noise part, which corresponds to a range without the occurrence of interference closer to the start point than to the measurement target surface; an end-point-side noise part straight line that approximates an end-point-side noise part, which corresponds to a range without the occurrence of interference closer to the end point than to the measurement target surface; and an interference part straight line that approximates an interference part, which corresponds to a range with the occurrence of interference in the vicinity of the measurement target surface, are determined, and wherein the position $Z_R$ in the Z-axis direction of the measurement target surface is determined based on the start-point-side noise part straight line, the end-point-side noise part straight line, and the interference part straight line, and the position determination of $Z_R$ in the Z-axis direction is determined for each pixel in the interference fringe images to obtain the surface shape of the measurement target, and wherein the incoherent light applied by the light source is light having a coherency that is intentionally lowered such that a coherence length is 100 μm or less, and light rays with various wavelengths in the light are mixed at a constant proportion.

\* \* \* \* \*